W. H. CRANE.
GRAIN HARVESTER AND BINDER.
APPLICATION FILED DEC. 28, 1916.
1,240,028.
Patented Sept. 11, 1917.
5 SHEETS—SHEET 4.
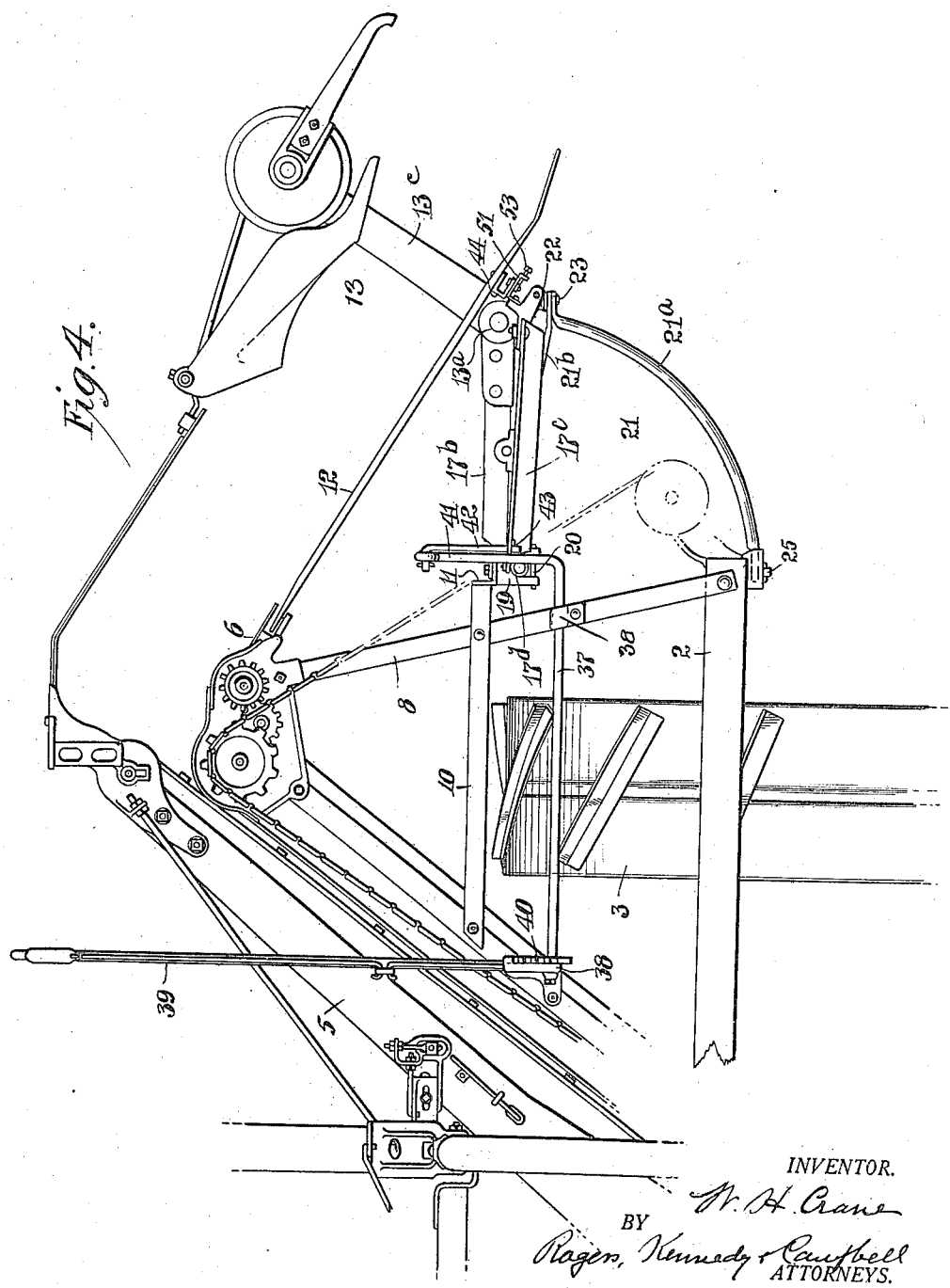
INVENTOR.
W. H. Crane
BY
Rogers, Kennedy & Campbell
ATTORNEYS.

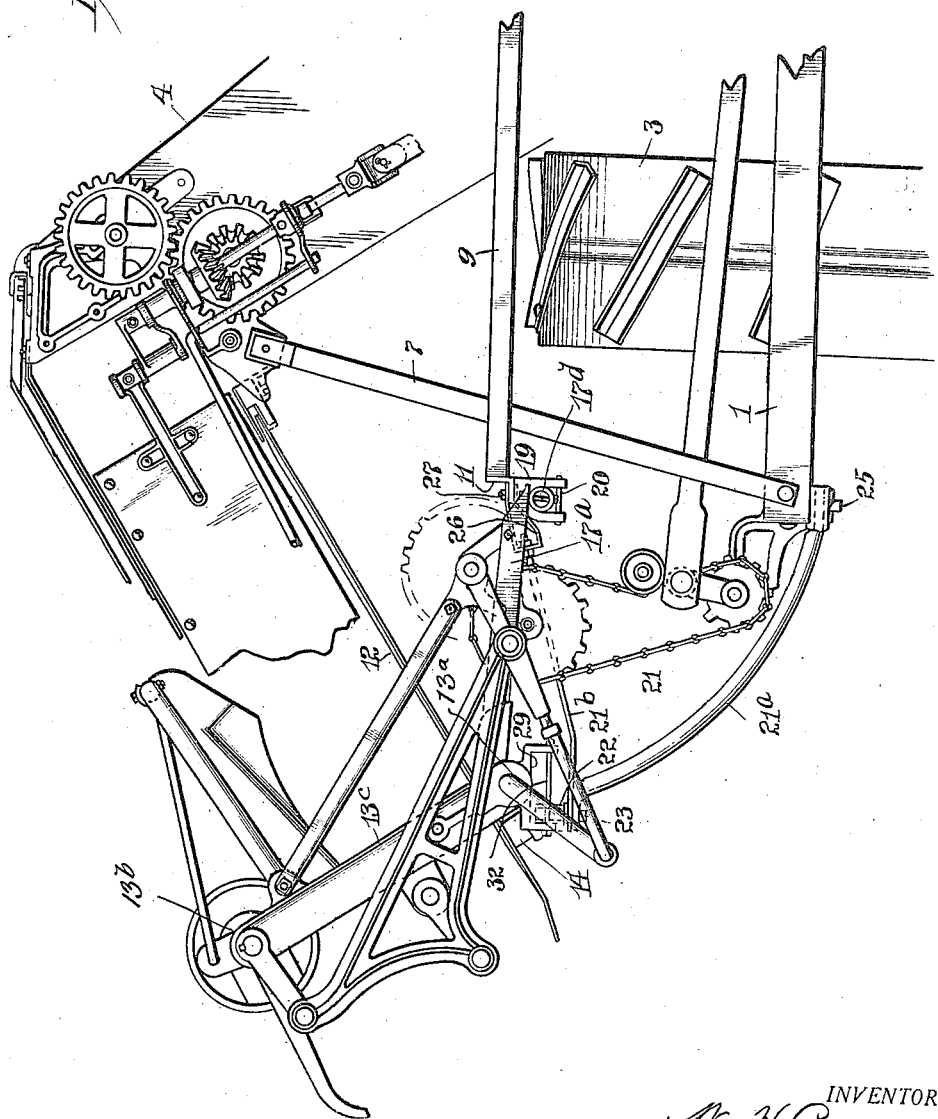

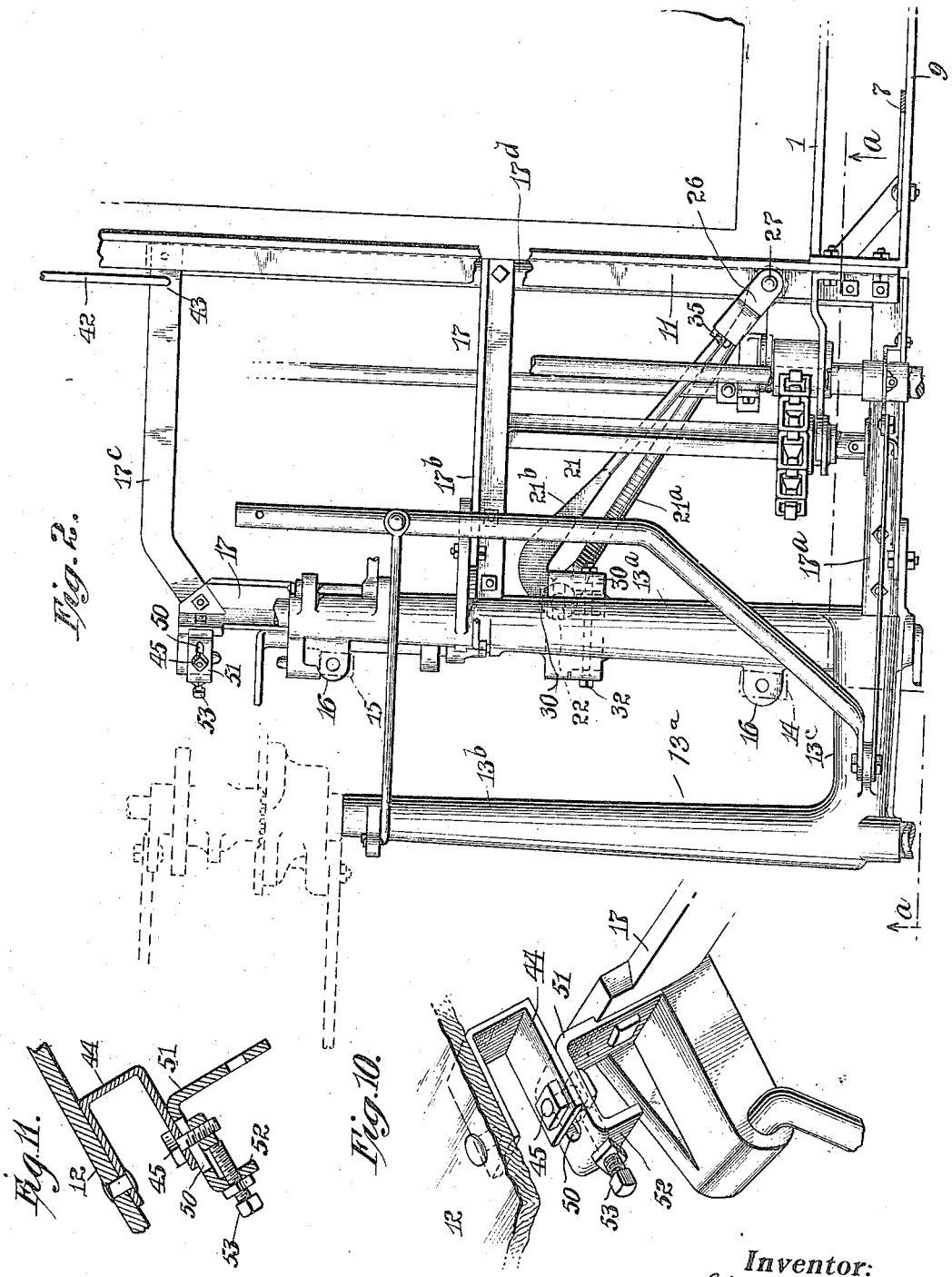

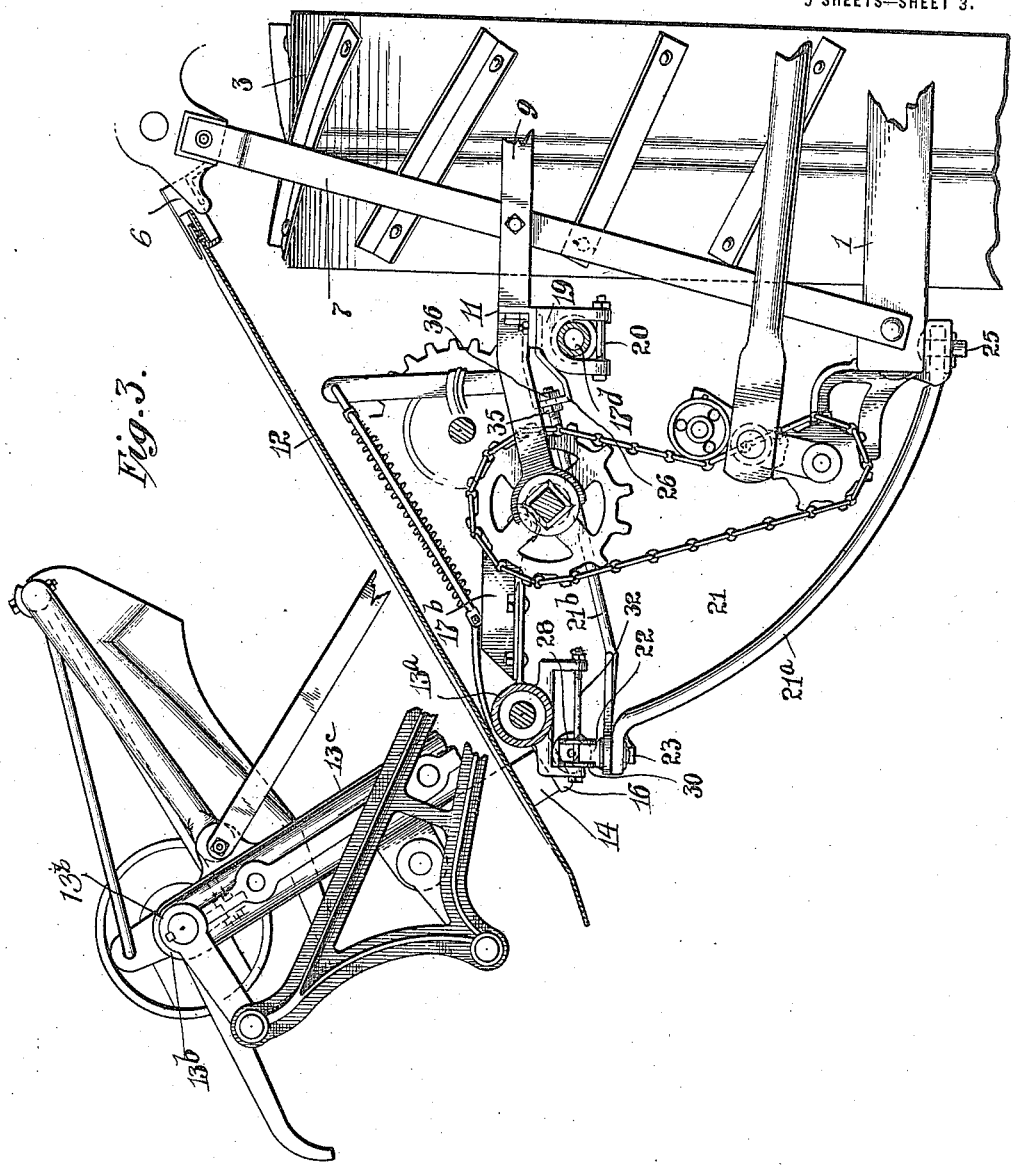

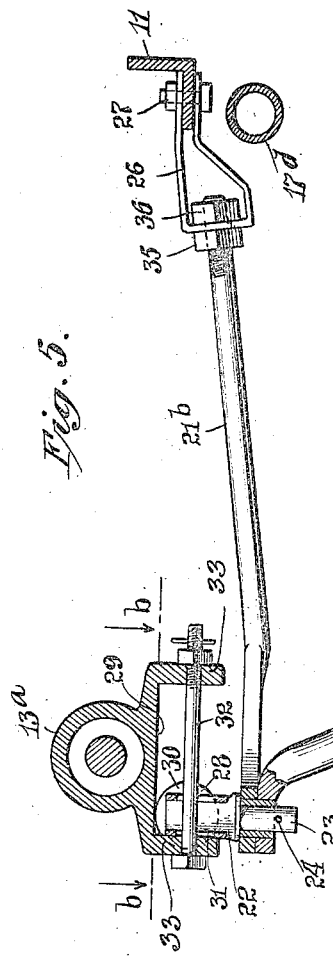
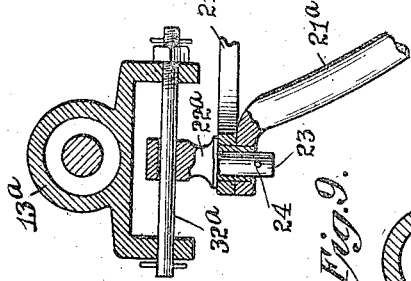

UNITED STATES PATENT OFFICE.

WILLIAM H. CRANE, OF POUGHKEEPSIE, NEW YORK, ASSIGNOR TO MOLINE PLOW COMPANY, A CORPORATION OF ILLINOIS.

GRAIN HARVESTER AND BINDER.

1,240,028.   Specification of Letters Patent.   Patented Sept. 11, 1917.

Application filed December 28, 1916. Serial No. 139,312.

*To all whom it may concern:*

Be it known that I, WILLIAM H. CRANE, a citizen of the United States, residing at Poughkeepsie, in the county of Dutchess and State of New York, have invented certain new and useful Improvements in Grain Harvesters and Binders, of which the following is a specification, reference being had therein to the accompanying drawing.

This invention relates to grain binding machines, and has reference more particularly to the manner of supporting the binding attachment forming a part of said machine, to enable the binding attachment to be readily adjusted to meet the varying conditions in practice as respects the length of the grain being harvested, and to enable the same to be effectively and fixedly sustained in its different positions of adjustment.

In machines of this type, the severed grain falling on the grain platform, is elevated by an upwardly inclined elevating mechanism and delivered thereby onto a downwardly inclined binder deck or table with which is associated the binding mechanism by which the grain is bound into bundles and delivered from the machine. The binder deck is maintained in fixed relation to the binding mechanism as a whole, and the two are supported by the frame of the machine in such manner that they may be adjusted relatively thereto in a fore and aft direction and be held in their adjusted positions, the purpose being to preserve the proper relation to the length of the grain, of the point where the binding twine is applied to the bundle.

My invention consists of an improved construction and arrangement of the means for sustaining and guiding the binding attachment in its shifting movements, so that it may be readily and easily adjusted by the operator and may be firmly and rigidly supported in its adjusted position, with little or no liability of sagging.

My invention consists also in so forming the supporting means for the binding attachment that it may be adjusted vertically to compensate for sagging.

My invention consists also in the details of construction and combination of parts hereinafter described and claimed.

In the accompanying drawings:

Figure 1 is a front elevation of the stubble end of a grain harvesting and binding machine having my invention embodied therein, parts being shown in section and other parts broken away to better illustrate the construction with which my invention is more directly concerned.

Fig. 2 is a top plan view of the same, the binding deck and certain other parts being omitted.

Fig. 3 is a vertical sectional elevation taken on the line $a$—$a$ of Fig. 2.

Fig. 4 is a rear elevation, partly in section, of the stubble end of the machine.

Fig. 5 is a sectional elevation on an enlarged scale of the swinging supporting member for the binding attachment, and attached parts.

Fig. 6 is a horizontal sectional plan view taken on the line $b$—$b$ of Fig. 5.

Fig. 7 is a perspective view of a detail of the swinging supporting member shown in Fig. 5.

Fig. 8 is a sectional elevation of a detail of said supporting member in modified form.

Fig. 9 is a similar view of another modification of the same.

Fig. 9ª is a front elevation of the parts shown in Fig. 9.

Fig. 10 is a perspective view of a detail for adjusting the binder deck to compensate for the sag of the same.

Fig. 11 is a vertical section through certain of the parts shown in Fig. 10.

Referring to the drawings:

The main frame of the machine includes front and rear frame members 1 and 2 sustaining the grain receiving platform and extending stubbleward beyond the same respectively at the front and rear of the ground wheel 3. 4 and 5 represent the front and rear elevator frames extending upwardly at an inclination stubbleward from the frame bars 1 and 2 and connected rigidly together at their upper ends by a cross bar 6; and 7 and 8 indicate front and rear bracing frame bars connected at their upper ends to the front and rear elevator frames and connected at their lower ends rigidly to the two horizontal frame bars 1 and 2 near their stubble ends. 9 indicates a horizontal front frame bar fixedly connected to the front elevator frame 4 and the front brace bar 7, the stubble end of said bar 9 extending some distance beyond the bar 7; and 10 indicates a rear frame bar similar to the bar 9 and connected respectively to the rear elevator frame 5 and the rear brace bar 8 and likewise extending at its stubble end some distance beyond said bar 8, the projecting ends of the bars 9 and 10 being connected together by a horizontal fore and aft extending angle-bar 11, the purpose of which will presently appear.

12 indicates the binder deck consisting of a flat plate extending at an inclination downwardly in a stubbleward direction from the cross bar 6, the upper edge of the deck being supported by and guided in a guideway in the bar 6 so that the deck may be shifted in a fore and aft direction relatively to the main frame.

13 indicates the usual U-shaped casting or frame of the binding attachment by which the main operative parts of the binding mechanism are sustained, this frame consisting of a lower horizontal arm 13$^a$, an upper horizontal arm 13$^b$ and a vertical head 13$^c$ connecting said arms. The head 13$^c$ extends through a slot in the binder deck and the lower arm 13$^a$ is arranged beneath the deck, which latter is fastened to two blocks 14 and 15 carried by ears 16 projecting downwardly from the lower arm 13$^a$, by which construction the binder deck and U-shaped frame are connected together in fixed relation.

Firmly connected to the lower arm of the U-shaped frame is a horizontal supporting frame 17 consisting of three horizontal fore and aft extending bars 17$^a$, 17$^b$ and 17$^c$, the outer ends of which are connected rigidly with the said arm 13$^a$, while their inner ends are fixedly connected together by a fore and aft extending bar 17$^d$, these connected bars forming in effect a rigid horizontal extension of the U-shaped frame which is movable with the latter and the binder deck in the shifting movements of the same.

This extension or frame 17 is supported at its inner end by the main frame of the machine in such manner that it may be shifted horizontally in a fore and aft direction in order to effect the adjustments of the binding attachment lengthwise of the grain. This is effected by means of two depending yokes 19 fixed to the angle bar 11 before alluded to and provided with horizontal supporting pins 20 sustained by the arms of the yokes, the bar 17$^d$ of the frame 17 being extended between the arms of the yokes and resting loosely on the pins, so that in the fore and aft shifting movements of the extension, the bar 17$^d$ will slide on and be supported by the pins.

The weight of the U-shaped frame and connected parts is supported in their fore and aft shifting movements by means of a horizontally swinging member 21 shown in detail in Fig. 5. This member consists of a lower inclined curved arm 21$^a$ and an upper horizontal sustaining link 21$^b$, the outer ends of which are connected together to form a supporting portion by means of a head 22 provided with a depending stud 23 extending loosely in alined openings in the ends of the arm and link and confined therein by a cotter pin 24, the head being thus swiveled to the supporting member. The lower end of the arm 21$^a$ is pivoted on a vertical axis by means of a vertical pivot pin 25 to the front frame member 1 before alluded to, while the inner end of the link 21$^b$ is adjustably connected, in the manner to be more fully described hereinafter, to a strap or yoke 26 which is pivoted by means of a vertical pivot bolt 27 to the angle bar 11 on a vertical axis coincident with the axis of the pivotal connection of the arm 21$^a$ with the frame bar 1. As a result of this construction the swinging member, made up of the arm and link, is adapted to swing horizontally about a vertical axis at its inner end.

The swiveling head 22 has journaled therein a vertical supporting roller 28 which bears against and travels on a horizontal flat bearing surface 29 on the under side of the lower arm 13$^a$ of the U-shaped frame, by means of which the frame and the parts connected therewith, including the binder deck, are given support by the swinging member, the roller 28 in the fore and aft shifting movements of the U-shaped frame and in the horizontal swinging movements of the swinging member, traveling along the said surface 29 in a direction transversely of the shifting movements of the binder frame. In this transverse movement of the roller, it is restricted to a rectilinear path on the surface 29 by means of two parallel ears 30 projecting laterally from the head 22 and provided with vertical slots 31 through which is extended a rod 32 carried by two lugs 33 depending from the lower arm of the U-shaped frame at opposite ends of the surface 29, the said rod being arranged at right angles to the direction of motion of the binder frame. As a result of this construction, the rod 32 acts to maintain the swiveling head 22 in a position to cause the roller thereon, in the swinging movements of the swinging member, to travel rectilinearly in a plane transversely of the arm of the binder frame. Due to the support of the parts by the swinging member through the medium of the roller, their shifting movements will be attended with the minimum of friction, and while the shifting parts will be effectively sustained against sagging, they may be moved for adjustment with ease and facility.

In the event of the parts sagging, due to the considerable weight of the binder frame and sustained binding mechanism, the sagging may be taken up and compensated for by the adjustable connection of the link 21ᵇ with the yoke 26 as shown in Fig. 5. Here it will be seen that the inner end of the link is threaded and passes freely through an opening in the end of the yoke, adjusting nuts 35 and 36 being screwed on the end of the link and bearing at opposite sides of the end of the yoke. By turning these screws in the proper direction, the link may be pulled endwise which will cause a lifting action on the outer end of the swinging member, there being sufficient play between the pivotal connection of the lower end of the arm and the pivotal connection of the ends of the arm and link to permit of such upward movement, which need be but very slight to effect the desired end.

In Fig. 8 a modification of the means for restricting the movement of the supporting portion of the swinging member to a path extending transversely of the shifting movements of the frame of the binding attachment is shown. In this case the roller 28 is omitted and the swiveling head 22ᵃ is formed with an opening through which the rod 32ᵃ loosely extends. The support of the U-shaped frame is received by the lower wall of the opening in the swiveling head indirectly through the medium of the rod 32ᵃ connected with the frame, the said head being compelled by said rod to travel, in the shifting movements of the U-shaped frame and in the swinging movements of the supporting member, in a rectilinear path transversely of the movements of the U-shaped frame.

In Fig. 9 still another modification of this mechanism is shown. In this case the swiveling head 22ᵇ has journaled thereon a vertical roller 28ᵃ containing a circumferential groove which receives a rib 32ᵇ extending downwardly from the under side of the lower arm of the U-shaped frame and extending transversely thereof, the weight of the U-shaped frame in this instance being supported by the roller, and the latter being compelled to pursue a rectilinear path transversely of the movement of the U-shaped frame, by the rod 32ᵇ engaging in the circumferential groove in the roller.

All of these three constructions constitute in effect an operative connection between the supporting portion of the swinging member 21 and the U-shaped frame of the binding attachment, by which, while the supporting portion of the swinging member will move with the U-shaped frame in its shifting movements, it will be caused in its relative movements to said U-shaped frame, to travel in a rectilinear path transversely of the direction of the shifting movements of the frame.

The horizontal fore and aft adjustment of the binding attachment may be effected by suitable means under the control of the driver. In the present instance these adjustments are effected by means of a horizontal rock shaft 37 mounted in bearing 38 on the machine frame, the inner end of the shaft having fixed to it an operating lever 39 within reach of the driver, which operating lever is provided with a locking latch adapted to engage a segment frame 40 fixed to the rear elevator frame 5. At its opposite end the rock shaft is provided with a crank arm 41 to which is pivoted one end of a link 42, the opposite end of which is pivoted as at 43 to the rear end of the frame or extension 17. By the operation of the hand lever the frame 17 and connected binding attachment and binder deck will be moved forwardly or backwardly as desired and may be locked in its adjusted position.

The binder deck 12, it will be remembered, is connected near its lower end to the lower arm of the U-shaped frame of the binding attachment through the medium of the blocks 14 fixed to the said frame, and at its upper edge it is supported by and guided on the fore and aft extending bar 6. It may happen in practice that the deck will sag or fall away at its upper edge from the supporting bar 6 and in order to compensate for such sagging action I propose to provide means whereby the deck may be adjusted upwardly relatively to the frame of the binding attachment. One form of means for accomplishing this result is shown in Fig. 10 where it will be seen that the binder deck has fixed to its under side at its rear end, a bracket 44. Depending from this bracket is a head 45 which extends in a vertical slot 50 in a bracket arm 51 rigidly connected with the supporting frame 17 at the outer rear end of the same. The bracket 44 rests flatly on the bracket arm 51 and the latter is provided with a depending lip 52 having a threaded opening therethrough in which is screwed an adjusting bolt 53, the inner end of which bears against the head on the bracket 44. By screwing up the adjusting bolt, the head 45 will be shifted in the slot 50 and will correspondingly raise the binder deck relatively to the frame of the binding attachment and in this manner the upper edge of the binder deck may be kept in proper operative relation to the bar 6, and the parallelism of said edge relatively to the bar preserved.

It will be observed from the form and construction of the swinging member which supports the binding attachment, that the weight of the binding attachment is received by said swinging member and not at a point to one side of said plane at a point within the plane of said member. This feature of construction I deem of importance and advantage in that the binding attachment is given firm and effective support by the swinging member in such manner that the latter will not be subjected to side or torsional strains, the movement of the parts will be attended with the minimum of friction so that the binding attachment may be adjusted with ease and facility and will be given effective support in its different positions of adjustment, without liability of sagging or displacement.

In the foregoing description and in the accompanying drawings I have disclosed my invention in the particular detailed form and construction which I prefer to adopt and which in practice has been found to answer to a satisfactory degree the ends to be attained. It is manifest, however, that these details may be variously changed and modified without departing from the limits of my invention, and further it is to be understood that the invention is not limited to any particular form or construction of the parts except in so far as such limitations are specified in the claims.

Having thus described my invention, what I claim is:

1. In a grain harvester and binder, the combination of a main frame, a binding attachment shiftable horizontally relatively to the main frame, a horizontally swinging supporting member mounted on the main frame on a vertical axis and comprising a lower arm and a connected upper link, said supporting member receiving the weight of the binding attachment at a point within the plane of the member, and means for shifting the binding attachment to adjust the same.

2. In a grain harvester and binder, the combination of a main frame, a binding attachment shiftable horizontally relatively thereto, a horizontally swinging supporting member mounted at its inner end on the main frame on a vertical axis and comprising a lower arm and an upper connected link, said member being provided at its outer end with a sustaining portion disposed in the plane of the member, and said supporting portion and receiving the weight of the binding attachment, and means for shifting the binding attachment to adjust the same.

3. In a grain harvester and binder, the combination of a main frame, a binding attachment shiftable horizontally relatively thereto, a horizontally swinging supporting member mounted at its inner end on the main frame on a vertical axis and provided at its outer end with a sustaining portion movable relatively to the supporting member and disposed in the plane of the said member and movably engaged with the binding attachment to support the same, means for shifting the binding attachment to adjust the same, and means for restricting the movement of the sustaining portion relatively to the binding attachment in a path transversely of the movement of the binding attachment.

4. In a grain harvester and binder, the combination of a main frame, a binding attachment including a frame shiftable horizontally relatively to the main frame, a horizontally swinging supporting member mounted on the main frame and provided with a sustaining portion movable relatively to the supporting member and giving support to said frame of the binding attachment, said sustaining portion being movable transversely relative to the shifting movements of the binding attachment, and means for shifting the binding attachment to adjust the same.

5. In a grain harvester and binder, the combination of a main frame, a binding attachment including a frame shiftable horizontally relatively thereto, a swinging supporting member pivoted to the main frame, a sustaining head on the supporting member movable relatively thereto and by which the frame of the binding attachment is supported in its shafting movements, and means for shifting the binding attachment to adjust the same.

6. In a grain harvester and binder, the combination of a main frame, a binding attachment including a frame shiftable horizontally relatively to the main frame, a horizontally swinging supporting member mounted on the main frame, a swiveling supporting head on said member engaged by the frame of the binding attachment and movable relatively to said frame in the shifting movements of the same, means acting on the head and restricting its relative movement to a path extending transversely of the shifting movements of the binding attachment, and means for shifting said binding attachment to adjust the same.

7. In a grain harvester and binder, the combination of a main frame, a binding mechanism including a frame shiftable horizontally relatively to the main frame, said frame being provided with a flat horizontal bearing surface, a horizontally swinging supporting member mounted on the main frame and provided with a supporting portion movable relatively thereto and engaging said bearing surface and movable along the same relatively to the frame of the binding attachment in the shifting movements of the latter, and means for shifting said binding attachment to adjust the same.

8. In a grain harvester and binder, the combination of a main frame, a binding attachment including a frame shiftable horizontally relatively to the main frame, a horizontally swinging supporting member mounted on the main frame and provided with a supporting portion movable relatively to the supporting member and engaged by the frame of the binding attachment and operatively connected thereto to move relatively to the same transversely in the shifting movements of the frame, and means for shifting the binding attachment to adjust the same.

9. In a grain harvester and binder, the combination of a main frame, a binding attachment including a frame shiftable horizontally relatively to the main frame, a horizontally swinging supporting member comprising a lower arm pivoted at its lower end to the main frame on a vertical axis and extending upwardly, and a horizontal link connected at its outer end to the upper end of said arm and pivoted at its inner end to the main frame on a vertical axis, the connected ends of said arm and link giving support to the frame of the binding attachment, means for adjusting the link endwise to raise the outer supporting ends of said parts to compensate for the sagging of the binding attachment, and means for shifting the binding attachment to adjust the same.

10. In a grain harvester and binder, the combination of a main frame, a binding attachment including a frame shiftable horizontally relatively to the main frame, a binding deck shiftable with the binding attachment, a rigid extension on said frame of the binding attachment projecting inwardly therefrom toward the main frame, beneath means on the main frame for giving support to said extension in the shifting movements of the binding attachment, a horizontally swinging supporting member mounted on the main frame and giving support to the frame of the binding attachment, and means for shifting the binding attachment to adjust the same.

11. In a grain harvester and binder, the combination of a main frame, a binding attachment including a frame shiftable horizontally relatively to the main frame, a binding deck shiftable with the binding attachment, a rigid supporting frame fixed to and extending inwardly from the frame of the binding attachment beneath the binding deck, said supporting frame being movably sustained at its inner end by the main frame, a horizontally swinging supporting member pivoted at its inner end to the main frame on a vertical axis and provided at its outer end with a supporting portion giving support to the frame of the binding attachment, and means for shifting the supporting frame to adjust the binding attachment.

12. In a grain harvester and binder, the combination of a main frame, a binding attachment including a frame shiftable horizontally relatively to the main frame, a binder deck connected with the frame of the binder attachment and sustained at its upper edge by the main frame to shift horizontally with the binding attachment, and means for adjusting the binder deck relatively edgewise to the frame of the binding attachment to compensate for sagging.

13. In a grain harvester and binder, the combination of a main frame, a binding attachment including a frame shiftable horizontally relatively to the main frame, a binder deck connected with the frame of the binder attachment and sustained at its upper edge by the main frame to shift horizontally with the binding attachment, a bracket at the lower edge of the binding deck, a bracket arm on the frame of the binding attachment by which the bracket is movably sustained, and an adjusting bolt carried by the bracket arm and engaging the bracket to adjust the binder deck relatively to the frame of the binding attachment to compensate for sagging.

14. In a grain harvester and binder, the combination of a main frame, a binding attachment including a frame shiftable horizontally relatively to the main frame, a binder deck connected with the frame of the binding attachment and sustained at its upper edge by the main frame to shift horizontally with the binding attachment, a bracket on the lower side of the binder deck provided with a depending head, a bracket arm on the frame of the binding attachment adapted to movably sustain the bracket and provided with a slot to receive the head on the bracket, and an adjusting bolt carried by the bracket arm and engaging the head; whereby the binder deck may be adjusted relatively to the frame of the binding attachment to compensate for sagging.

In testimony whereof, I have affixed my signature.

WILLIAM H. CRANE.

Copies of this patent may be obtained for five cents each, by addressing the "Commissioner of Patents, Washington, D. C."